US011221871B2

(12) United States Patent
Alcorn et al.

(10) Patent No.: US 11,221,871 B2
(45) Date of Patent: Jan. 11, 2022

(54) ENABLING A MANAGEMENT FUNCTION ON A COMPUTE NODE IN RESPONSE TO A USER WORKLOAD OWNERSHIP LEVEL

(71) Applicant: Lenovo Enterprise Solutions (Singapore) Pte. Ltd., Singapore (SG)

(72) Inventors: Matthew Robert Alcorn, Durham, NC (US); James Gordon McLean, Raleigh, NC (US); Antonio Abbondanzio, Raleigh, NC (US); Fred Allison Bower, III, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 171 days.

(21) Appl. No.: 16/664,132

(22) Filed: Oct. 25, 2019

(65) Prior Publication Data

US 2021/0124606 A1     Apr. 29, 2021

(51) Int. Cl.
*G06F 9/46*       (2006.01)
*G06F 9/48*       (2006.01)
*H04L 29/08*      (2006.01)

(52) U.S. Cl.
CPC ............ *G06F 9/468* (2013.01); *G06F 9/4856* (2013.01); *H04L 67/1002* (2013.01)

(58) Field of Classification Search
CPC ..... G06F 9/468; G06F 9/4856; H04L 67/1002
See application file for complete search history.

(56) References Cited

U.S. PATENT DOCUMENTS 6,782,410 B1 * 8/2004 Bhagat .................. G06F 9/5027
                                                    709/201
7,426,539 B2 * 9/2008 Datta ....................... A63F 13/12
                                                    709/205

(Continued)

FOREIGN PATENT DOCUMENTS

CN      108733533 A   * 11/2018
JP      2007299427 A  * 11/2007

OTHER PUBLICATIONS

Takahashi et al. JP 2007299427 A Description Translation, Aug. 6, 2007, [retrieved on May 11, 2021] <URL:https://globaldossier.uspto.gov/#/details/JP/2007203761/A/118287>, pp. 1-12 (Year: 2007).*

(Continued)

*Primary Examiner* — Meng Ai T An
*Assistant Examiner* — Hsing Chun Lin
(74) *Attorney, Agent, or Firm* — Jeffrey Streets

(57) ABSTRACT

An apparatus and a computer program product include program instructions configured to be executable by a processor to cause the processor to perform operations. The operations include managing workload instances running on a computing system that includes a plurality of compute nodes, wherein the workload instances include at least one workload instance owned by each of a plurality of users. The operations further include identifying, for each workload instance, which user among the plurality of users owns the workload instance and which compute node among the plurality of compute nodes is running the workload instance. Additionally, the operations further include enabling, for any given compute node among the plurality of compute nodes, a particular user among the plurality of users to perform a management function on the given compute node in response to all of the workloads running on the given compute node being owned by the particular user.

20 Claims, 5 Drawing Sheets

28 — Information Access and Management Control Function Enablement Rules

| Requirement for Enabling User Management Control Over Node: | | | Information Access/ Management Control Function: |
|---|---|---|---|
| Exclusive Ownership | Shared Ownership | No Ownership | |
| X | | | Powering node on and off |
| X | | | Virtually reseat node |
| X | X | | Recovering a failed node |
| X | X | X | View node details |
| X | X | | View node status |
| | | | |
| | | | |
| | | | |
| | | | |

(56) References Cited

U.S. PATENT DOCUMENTS

| | | | | |
|---|---|---|---|---|
| 7,941,510 | B1* | 5/2011 | Tormasov | H04L 41/22 709/220 |
| 8,549,112 | B2* | 10/2013 | Ueno | H04L 63/029 709/219 |
| 9,774,586 | B1* | 9/2017 | Roche | G06F 21/6218 |
| 10,178,184 | B2* | 1/2019 | Dorr | H04L 67/10 |
| 2009/0328155 | A1* | 12/2009 | Madathilparamgil George | G06F 9/468 726/4 |
| 2015/0095917 | A1* | 4/2015 | Challenger | G06F 9/4843 718/104 |
| 2015/0193276 | A1* | 7/2015 | Maclinovsky | G06F 9/5061 718/104 |
| 2018/0210727 | A1* | 7/2018 | Elliott | G06F 8/71 |
| 2018/0246837 | A1* | 8/2018 | Heracleous | G06F 13/4081 |
| 2018/0349625 | A1* | 12/2018 | Ikram | H04L 63/08 |

OTHER PUBLICATIONS

Dalwadi et al. Introducing sole-tenant nodes for Google Compute Engine—when sharing isn't an option, Jun. 7, 2018, [retrieved on Jun. 7, 2021] <URL:https://cloud.google.com/blog/products/gcp/introducing-sole-tenant-nodes-for-google-compute-engine?utm_source=feedburner&utm_medium=feed&utm_cam>,p. 1 (Year: 2018).*

Chhabra et al. CN108733533A Description Translation, Nov. 2, 2018, [database online], [retrieved on Feb. 9, 2021] Retrieved from Espacenet using Internet <URL:https://worldwide.espacenet.com/publicationDetails/description?CC=CN&NR=108733533A&KC=A&FT=D&ND=3&date=20181102&DB=&locale=en_EP>, pp. 1-20 (Year: 2018).*

\* cited by examiner

| Workload Identification | User (Owner) | Hardware Used by the Workload |
|---|---|---|
| 1 | User A | Chasis X, Server X1 |
| 2 | User A | Chasis X, Server X2 |
| 3 | User B | Chasis X, Server X3 |
| 4 | User C | Chasis Y, Server Y1 |
| 5 | User C | Chasis Y, Server Y2 |
| 6 | User C | Chasis Y, Server Y3 |
| 7 | User C | Chasis Y, Server Y4 |

*Information Access and Management Control Function Enablement Rules*

| | Requirement for Enabling User Management Control Over Node: | | | Information Access/ Management Control Function: |
|---|---|---|---|---|
| | Exclusive Ownership | Shared Ownership | No Ownership | |
| | X | | | Powering node on and off |
| | X | | | Virtually reseat node |
| | X | X | | Recovering a failed node |
| | X | X | X | View node details |
| | X | X | | View node status |

*FIG. 4*

ENABLING A MANAGEMENT FUNCTION ON A COMPUTE NODE IN RESPONSE TO A USER WORKLOAD OWNERSHIP LEVEL

BACKGROUND

The present disclosure relates to system management tools for the management of a computing system.

BACKGROUND OF THE RELATED ART

A computing system that can process large or numerous applications and tasks may include a substantial number of hardware entities. For example, a datacenter may include a large number of servers along with supporting networking devices and data storage devices. In order to facilitate efficient management of a substantial number of servers or other devices, a large computing system may further include system management tools, which may run on a management server.

System management tools, such as the Lenovo XClarity® Administrator, are increasingly extending beyond the centralized management of computing system hardware to further include management of system workloads and management of virtual machine (VM) provisioning, control and migration. Furthermore, multiple users may co-locate their computing systems in a common datacenter or may share a computing system within a datacenter. For example, virtual machines or tasks may originate from multiple users, yet share space in the same datacenter or even operate on the same hardware. This means that users who want to use the available system management tools with respect to their own workloads may gain visibility into other users' workloads or may have the ability to take actions that could impact other users' workloads.

BRIEF SUMMARY

Some embodiments provide a computer program product comprising a non-volatile computer readable medium and non-transitory program instructions embodied therein, the program instructions being configured to be executable by a processor to cause the processor to perform operations. The operations may comprise managing a plurality of workload instances running on a computing system that includes a plurality of compute nodes, wherein the plurality of workload instances includes at least one workload instance owned by each of a plurality of users. The operations may further comprise identifying, for each workload instance, which user among the plurality of users owns the workload instance and which compute node among the plurality of compute nodes is running the workload instance. Additionally, the operations may further comprise enabling, for any given compute node among the plurality of compute nodes, a particular user among the plurality of users to perform a management function on the given compute node in response to all of the workloads running on the given compute node being owned by the particular user.

Some embodiments provide an apparatus comprising at least one non-volatile storage device storing program instructions and at least one processor configured to process the program instructions, wherein the program instructions are configured to, when processed by the at least one processor, cause the apparatus to perform operations. The operations may comprise managing a plurality of workload instances running on a computing system that includes a plurality of compute nodes, wherein the plurality of workload instances includes at least one workload instance owned by each of a plurality of users. The operations may further comprise identifying, for each workload instance, which user among the plurality of users owns the workload instance and which compute node among the plurality of compute nodes is running the workload instance. Additionally, the operations may further comprise enabling, for any given compute node among the plurality of compute nodes, a particular user among the plurality of users to perform a management function on the given compute node in response to all of the workloads running on the given compute node being owned by the particular user.

BRIEF DESCRIPTION OF THE SEVERAL VIEWS OF THE DRAWINGS

FIG. 4 is an illustration of rules for enabling user information access and management control function enablement.

DETAILED DESCRIPTION

Figure 1:
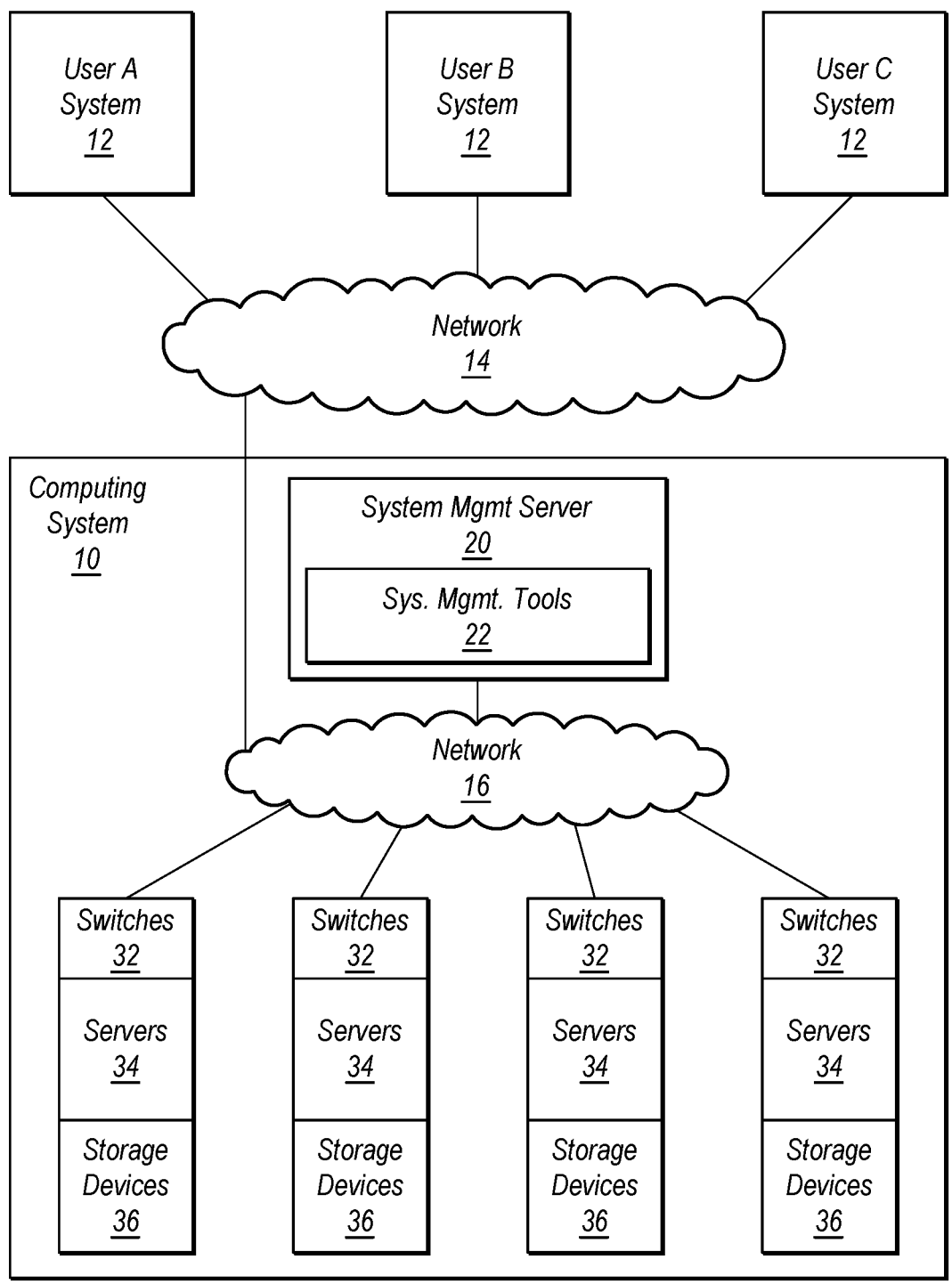
FIG. 1 is a diagram of a datacenter having a computing system that is shared by multiple users.

Some embodiments provide a computer program product comprising a non-volatile computer readable medium and non-transitory program instructions embodied therein, the program instructions being configured to be executable by a processor to cause the processor to perform operations. The operations may comprise managing a plurality of workload instances running on a computing system that includes a plurality of compute nodes, wherein a plurality of users each own a workload instance among the plurality of workload instances. The operations may further comprise identifying, for each workload instance, which user among the plurality of users owns the workload instance and which compute node among the plurality of compute nodes is running the workload instance. Additionally, the operations may further comprise enabling, for any given compute node among the plurality of compute nodes, a particular user among the plurality of users to perform a management function on the given compute node in response to all of the workloads running on the given compute node being owned by the particular user.

The computing system may be any computing system having a plurality of compute nodes. Non-limiting examples of the computing system may include everything from a single multi-node chassis to a datacenter having thousands of compute nodes. The program instructions may form, or be included in, system management tools, such as the Lenovo XClarity® Administrator. Accordingly, the program instructions may run on one or more processor of a dedicated system management server, a chassis management module, or one of the plurality of compute nodes.

A workload instance is any application, program, process or task that is able to be performed on one of the compute nodes. Furthermore, a workload instance may be associated with a user that submits or initiates the workload instance on the computing system. For example, a particular user may login or otherwise establish a connection to the computing system by providing unique identification information to authenticate themselves to the computing system, such that all workload instances submitted, initiated or received over the connection are associated or "owned" by that particular user. Alternatively, a user may take some other action to identify which workload instances are owned by the user, such as including ownership identification in the workload instance itself or identifying the workload instance and owner to a system management tool. Some embodiments will facilitate a plurality of users, where each user has their own unique login or other authentication means.

The computing system allows any one or more of the compute nodes to perform or run multiple workloads instances at any given point in time. A compute node may run multiple workload instances in any manner, such as using virtualization to form multiple virtual machines that may each perform or run one or more of the workload instances.

A system management tool may be responsible for assigning each workload instance to one of the compute nodes within the computing system. These assignments may be made in consideration of various considerations. For example, workload assignments may be made for the purpose of load balancing across compute nodes, managing power consumption, satisfying quality of service obligations, providing suitable compute node configurations, and the like. Furthermore, these assignments may be made initially upon receipt of a workload instance from a user (i.e., "provisioning") and/or during performance of the workload instance (i.e., "migrating").

Some embodiments of a system management tool may provide a user interface accessible to the users and may selectively enable one or more of the users to perform management functions on any given compute node or any given workload instance. Some embodiments may enable a particular user to perform a management function on a given compute node based upon the user's ownership of one or more workload instances that are running on the given compute node. In one example, a particular user may be enabled to perform a certain management function on a given compute node in response to all of the workloads running on the given compute node being owned by the particular user. However, if the particular user has been enabled to perform a certain management function on a given compute node as a result of the particular user owning all of the workload running on the given compute node, a system management tool may still cause a further workload instance to be run on the given compute node and may subsequently prevent the particular user from managing the given compute node if the further workload instance is not owned by the particular user. The further workload instance may be caused to run on the given compute node as a result of a system management tool instructing a compute node among the plurality of compute nodes to migrate the further workload instance to the given compute node.

In another example, a particular user may be enabled to perform a certain management function on a given compute node in response to the particular user owning any of the workloads running on the given compute node. Some embodiments allow a system administrator to select the extent of workload ownership that a particular user must have in order to be enabled to perform any one of the available management functions. Accordingly, a particular user might be enabled to perform a first management function on a node only if the particular user owns every workload instance running on the node, a particular user might be enabled to perform a second management function on the node if the particular user owns any workload instance running on the node, or a particular user might be enabled to perform a third management function on a node regardless of owning any workload instance running on the node.

Some embodiments include a system management tool having a management function that, when enabled for a particular user, allows the particular user to access information about the operation of a given compute node. Furthermore, the system management tool may prevent other users from accessing the information unless those users are similarly able to meet the required ownership of workload instances on the given compute node. Access to information may include viewing and/or downloading the information that is available to the system management tool.

Some embodiments include a system management tool having a management function that, when enabled for a particular user, allows the particular user to perform a management control function on the given compute node. One non-limiting example of a management control function is control over power to the compute node. The system management tool may prevent other users from performing the management control function on the compute node unless those users are similarly able to meet the required ownership of workload instances on the given compute node.

Some embodiments may enable, for each workload instance, the user that owns the workload instance to manage the workload instance. Accordingly, where multiple users each own a workload instance on a given compute node, each user may manage the workload instance that they own. Managing the workload instance may include starting and stopping the workload instance, monitoring progress of the performance of the workload instance, accessing information about the operation of the workload instance or performing other processes to debug the workload instance.

In a computing system that includes a multi-node chassis supporting multiple compute nodes, some embodiments may enable a particular user among the plurality of users to manage the multi-node chassis in response to all of the workloads running on compute nodes within the multi-node chassis being owned by the particular user. In other words, while some embodiments enable a particular user to manage an individual compute node in response to the particular user owning all of the workload instances running the individual compute node, some embodiments may further enable a particular user to manage a multi-node chassis in response to the particular user owning all of the workload instances running on all of the compute nodes within the multi-node chassis. Managing a multi-node chassis may include access to information and/or control over the functions of any chassis component, such as a chassis management module, chassis power module, and/or chassis network interface.

Some embodiments may include dynamically changing which of the compute nodes is running a given workload instance among the plurality of workload instances, and dynamically determining, for any given compute node among the plurality of compute nodes, whether any given user among the plurality of users owns all of the workloads running on the given compute node. A system management tool or other management module may dynamically change which of the compute nodes is running a given workload instance by initiating migration of the workload instance from a source node to a destination node. For example, migration of a workload instance from one node to another node may be performed for the purpose of load balancing across compute nodes, managing power consumption, satisfying quality of service obligations, providing suitable compute node configurations for the workload instances, and the like. By dynamically determining, for any given compute node among the plurality of compute nodes, whether any given user among the plurality of users owns all of the workloads running on the given compute node, any change in the workload ownership on a given compute node may be immediately reflected in the management functions enabled for a given user. Optionally, any system management tool that initiates migration of a workload instance will notify any system management tool that enables management functions for users so that a user is never enabled to perform a management control function on a given compute node when the current ownership of workload instances would no longer satisfy the established ownership requirement. It should be further appreciated that the computing system may receive and provision additional workload instances at any time, and/or may complete currently running workload instances such that they no longer consume compute node resources. Therefore, the workload instances running in the computing system at any point in time may change at any time and the ownership of workload instances on any of the compute nodes must be kept current.

Some embodiments may enable a system administrator to manage any given compute node among the plurality of compute nodes regardless of whether all of the workload instances running on the given compute node are owned by a single user. Accordingly, the system administrator may have the ability to manage any compute node or chassis in the computing system, even if a particular user has also been enabled to perform management functions on the given compute node or chassis. In other words, enabling a user to perform management functions on an entity of the computing system may not exclude the system administrator or other users from having simultaneous permissions and performing management functions on the same entity.

Some embodiments may enable a system administrator to manage a given compute node in response to the workload instances running on the compute node not being owned by a single user. For example, if a particular user has been enabled to perform management functions on a given compute node in response to the particular user owning all workload instances running on the given compute node, the system administrator may be precluded from performing management functions on the given compute node. Alternatively, for any given node, the system administrator may be precluded from performing only those management functions that have been enabled for performance by the particular user. Still, users may still be enabled to manage the workload instances that they own, regardless of who is able to perform management function on the compute node that is running those workload instances.

Some embodiments may enable, for any given compute node, any given user among the plurality of users to manage the given compute node in response to the given user owning one or more of the workloads running on the given compute node. In other words, each user owning a workload instance that is running on the given compute node may be enabled to perform a management function on the given compute node. This means that multiple users may simultaneously have the same ability to perform a management function on the same compute node. Accordingly, some embodiments may provide each user that is enabled to manage the given compute node with notification of management actions that may impact workload instances running on the given compute node that are owned by another user.

Some embodiments may restrict the management control that may be performed on the given compute node by the particular user to a subset of management control functions. For example, a system administrator may select a subset of management control functions that may be performed by a user and the conditions that must exist before enabling a user to actually perform one of the management control functions in the subset. In one option, a system management tool may provide an interface that displays a list of available management control functions and allows the system administrator to select which of the available management control functions may be performed by a user and what conditions must be satisfied before a user may be enabled to perform the selected management control function. The available management control functions and the conditions to be satisfied before enabling those management control functions may be selected in groups of similar functions or as individual functions.

Some embodiments may enable, for any given compute node among the plurality of compute nodes, a particular user among the plurality of users to perform a second management control function on the given compute node in response to at least one of the workloads running on the given compute node being owned by the particular user. In other words, a particular user may be enabled to perform certain management control functions only if the user owns all of the workload instances on a given compute node, while the particular user may be enabled to perform other management control functions if the user owns even one workload instance running on the given compute node. The individual conditions that must be satisfied before enabling a particular user to perform a specific management control function may be setup by a system administrator, such as using the previously described administrator interface. Similarly, a particular user may be enabled to access certain information about a compute node only if the user owns all of the workload instances on a given compute node, while the particular user may be enabled to access other information about the compute node if the user owns even one workload instance running on the given compute node.

Some embodiments may similarly enable a user to access information and/or control management functions relative to other shared resources of the computing system based upon ownership of workload instances that are utilizing those other shared resources. For example, if a given workload instance is running on a given compute node within the computing system, that given workload instance may also store information in a storage device, communicate with other workload instances running on other compute nodes over a network switch, or interface with resources beyond the computing system using a network adapter. Accordingly, a user that owns a workload instance that is actively using a shared resource of the computing system, may be enabled to access information about the operation of the shared resource and/or enabled to perform management control functions on the shared resource on the basis of the workload instance ownership. Optionally, the system administrator may customize the extent of workload instance ownership that is required to access operating information and/or control management functions for each shared resource, each type of information and/or each management function.

Some embodiments may enable a system administrator or a user to assign or delegate system capabilities or privileges that are within their current scope of capabilities or privileges to another designated current or new user. The form of delegation may be that of a sub-lessee of the user's capabilities or privileges, such that the sub-lessee may independently use a portion of the user's capabilities or privileges. Alternatively, the form of the delegation may be that of an agent of the user, such that the agent may take actions on behalf of the user across the full scope of the user's capabilities or privileges. In one example, the operations may include enabling a particular user among the plurality of users to delegate a privilege to perform a given management control function on a given compute node for which the particular user has been enabled to perform the given management control function on the given compute node.

Some embodiments may provide low-level system management capabilities to remote users, such as employees, customers or lessees, without compromising other users of the datacenter. Some embodiments may allow datacenter owners or administrators to retain full control of all managed elements of the computing system without dealing with multiple instances of system management tools.

Some embodiments provide an apparatus comprising at least one non-volatile storage device storing program instructions and at least one processor configured to process the program instructions, wherein the program instructions are configured to, when processed by the at least one processor, cause the apparatus to perform operations. The operations may comprise managing a plurality of workload instances running on a computing system that includes a plurality of compute nodes, wherein a plurality of users each own a workload instance among the plurality of workload instances. The operations may further comprise identifying, for each workload instance, which user among the plurality of users owns the workload instance and which compute node among the plurality of compute nodes is running the workload instance. Additionally, the operations may further comprise enabling, for any given compute node among the plurality of compute nodes, a particular user among the plurality of users to perform a management control function on the given compute node in response to all of the workloads running on the given compute node being owned by the particular user.

The foregoing apparatus may further perform operations corresponding to any one or more of the operations of the computer program products described herein. Accordingly, a separate description of the operations will not be duplicated in the context of an apparatus.

FIG. 1 is a diagram of a computing system 10 that is shared by multiple users. In this example, the multiple users include remote user systems (User A, User B, User C) 12 that connect with the computing system 10 via a network 14, such as a wide area network. The computing system 10 may also include a network 16, such as local area network, that provides connection between a system management server 20 and various nodes, such as the switches 32, servers (compute nodes) 34, data storage devices 36, and other types of nodes not shown. The system management server 20 includes a processor (not shown) that executes program instructions to perform operations implementing one or more system management tools 22 according to one or more of the disclosed embodiments. Some embodiments may provide a dedicated system management server running a single instance of the system management tools that may enable a user to selectively access information and control various system management functions.

Figures 2, 3:
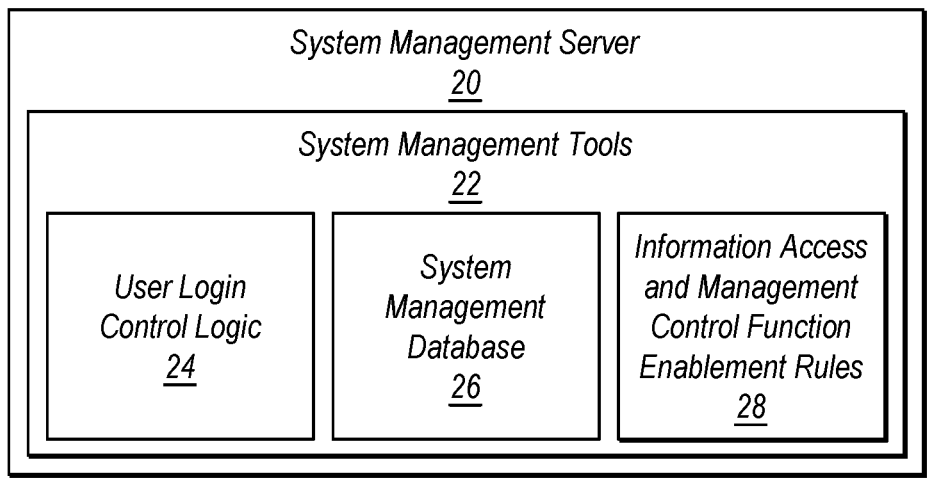
FIG. 2 is a diagram of system management tools.
FIG. 3 is a table representing a system management database.

FIG. 2 is a diagram of the system management tools 22 running in the system management server 20. Embodiments of the system management tools may be implemented in various manners, but are illustrated as including a set of logic/data components/module. The illustrated embodiment includes User Login Control Logic 24, System Management Database 26, and Information Access and Management Control Function Enablement Rules 28.

The User Login Control Logic 24 may include program instructions for providing user identification and authentication functions. Embodiments may prevent unauthorized users from gaining access to either the compute nodes or the system management tools, and may establish a user session in which all workload instances received via the session are designated as being "owned" by the user uniquely associated with the login credentials used to establish the user session.

The System Management Database 26 may track each workload instance that is running in the computing system. For example, each workload instance may be identified by a unique number assigned when the workload instance is initially provisioned. For each identified workload instance running in the computing system, the database 27 may further identify the user or owner of the workload instance and identify the hardware used by the workload instance. The hardware may include a compute node, a chassis, a switch, a data storage device or combinations thereof. A non-limiting example of a suitable data structure is a table with a plurality of records (one record per row), where each record identifies a workload instance running on the computing system, the user/owner of the workload instance and the hardware node on which the workload instance is running. In this manner, a workload instance, user/owner and hardware node are associated by being stored in fields of the same record. Other data structures may be used and may have their own manner of identifying an association between a workload instance and a user.

The Information Access and Management Control Function Enablement Rules 28 may include a data structure or list of available information about the operation of a node and available management control functions relative to the node. The available information and management control functions may be different for a compute node than for a multi-node chassis or a shared system resource. However, embodiments may list available operating parameters and management control functions, then allow a system administrator to separately designate a level of workload instance ownership necessary to enable a particular user to gain access to each operating parameter or perform each management control function on a given node. Some embodiments may require a particular user to own all workload instances on a given node in order for the particular user to be enabled access to a given operating parameter or perform a given management control function. Some embodiments may only require a particular user to own one or more workload instance on a given node in order to be enabled access to a given operating parameter or perform a given management control function. Furthermore, some embodiments may not require a particular user to own any workload instance on a given node in order to enable access to a given operating parameter or perform a given management control function, while some embodiments may not enable access to a given operating parameter or performance of a given management control function regardless of the extent of workload instance ownership for the given user.

FIG. 3 is a table representing a system management database 27. Some embodiments of a system management database may have a record for each workload instance that is running in the computing system, such as a datacenter. Each record may identify the workload instance, the user/owner of the workload instance, and the hardware being used by the workload instance, such that the workload instance is associated with the user/owner and the hardware by virtue of being stored in the same record of the database.

For example, the workload instance may be identified by a unique alphanumeric assigned at the time that the workload instance is provisioned and released at the time that the workload instance has been completed. As previously described, the hardware may be any one or more node within the computing system, such as a compute node, chassis, switch, data storage device, network adapter and/or other shared hardware. A node may be identified by a unique hardware identifier, a network address, a hardware location and/or any other manner to distinguish hardware nodes.

FIG. 4 is an illustration of a data structure providing a few Information Access and Management Control Function Enablement Rules 28. The data structure is conveniently illustrated as a table, but is not limited to being a table. In some embodiments, a rules database may have a permission bit per action or set of actions per user or set of users. Furthermore, a system management tool may include a set of similar tables, where each table enumerates all of the possible access and control rules for a given hardware device of the computing system with an entry indicating the level of workload instance ownership required in order to enable the access and/or control. The levels of workload instance ownership illustrated in the table include exclusive ownership (a given user owning every workload instance running on the node or using the node), shared ownership (a given user owning at least one, but not every, workload instance running on the node or using the node), or no ownership (a given user does not need to own any workload instance on the node).

The type and number of operating parameters and management control functions listed in the rules is not limited and may be represented at any desired level of granularity ranging from broad categories of parameters and functions to specific individual parameters and functions. In some embodiments, each user has full and exclusive access and control over the workload instances that they own, such that no additional rules are necessary to establish user access and control to workload instances. Accordingly, the illustrated rules only address access and control of a certain hardware node, including any management software, operating system or firmware on that hardware node. In some embodiments, the rules may govern access and control to any and/or all information and management control functions within the computing system that are outside the scope of an individual workload instance. The data structure could be provided to a system administrator as a system management interface that allows the system administrator to select, for example, a management control function that may be performed by an owner of a workload instance and the level of workload instance ownership on a given node that that would result in enabling a user to actually perform the management control function on the given node.

As illustrated in FIG. 4, the Information Access and Management Control Function Enablement Rules 28 for a given node or node type would enable any workload instance owner to access specific information or perform specific management control functions if the workload instance owner meets the required level of workload instance ownership on the given node or node type. Specifically, a particular user might be enabled to perform a first management control function of "Powering node on and off" only if the particular user owns every workload instance running on the node ("exclusive ownership"), a particular user might be enabled to perform a second management function of "Virtually reseat node" only if the particular user owns every workload instance running on the node, a particular user might be enabled to perform a third management control function of "Recovering a failed node" if the particular user owns any workload instance running on the node ("shared ownership"), a particular user might be enabled to access first node information of "View node details" without owning any workload instance on the node ("no ownership"), and a particular user might be enable to access second node information of "View node status" if the particular user owns at least one, but not every, workload instance running on the node. In this example, a user with "exclusive ownership" on a given node is enabled to have full access and control. In general, if a lower level of workload instance ownership is sufficient to enable a particular access or control, then the higher level or levels of workload instance ownership may also enable that particular access or control. A set of Information Access and Management Control Function Enablement Rules may cover access to different or additional operating parameters, may cover performance of different or additional management control functions, and may provide for different or additional workload instance ownership criteria.

In an actual implementation, a workload instance owner might access a computing system by invoking an application programming interface (API) and presenting their credentials. The management tools may then cross-reference the credentials with workload ownership and node placement of the workload instances owned by the user, then use the Information Access and Management Control Function Enablement Rules to determine the scope of information access and management control functions that will be enabled for use by the user on a given node.

Figure 5:
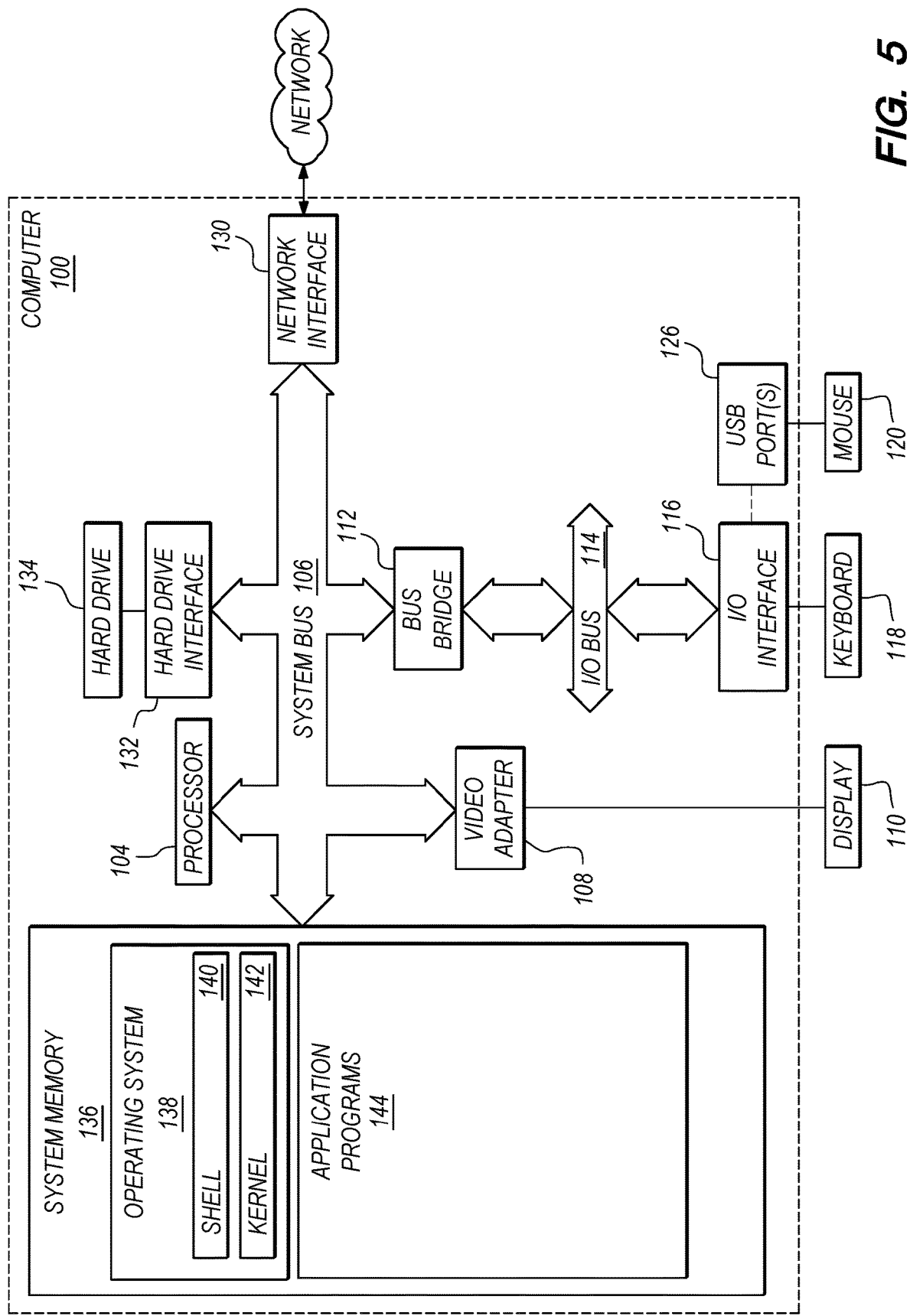
FIG. 5 is a diagram of a computer that may be representative of a system management server, a user computer, or a managed server.

FIG. 5 is a diagram of a generic computer 100 that may be representative of one or more of the user systems 12, the system management server 20, and the servers 34 of FIG. 1. The computer 100 includes a processor unit 104 that is coupled to a system bus 106. The processor unit 104 may utilize one or more processors, each of which has one or more processor cores. A video adapter 108, which drives/supports a display 110, is also coupled to system bus 106. The system bus 106 is coupled via a bus bridge 112 to an input/output (I/O) bus 114. An I/O interface 116 is coupled to the I/O bus 114. The I/O interface 116 affords communication with various I/O devices, including a keyboard 118, and a USB mouse 124 via USB port(s) 126. As depicted, the computer 100 is able to communicate with other network devices over the network 50 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory includes additional higher levels of volatile memory (not shown), including, but not limited to, cache memory, registers and buffers. Data that populates the system memory 136 includes the operating system (OS) 138 and application programs 144.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 may be a text-based, line-oriented user interface, the present invention may support other user interface modes, such as graphical, voice, gestural, etc.

As depicted, the operating system 138 also includes the kernel 142, which includes lower levels of functionality for the operating system 138, including providing essential services required by other parts of the operating system 138 and application programs 144. Such essential services may include memory management, process and task management, disk management, and mouse and keyboard management.

As shown, the computer 100 includes application programs 144 in the system memory of the computer 100. While not specifically shown in FIG. 2, the application programs 144 may include the system management tools 22 in the case that the computer 100 is the system management server 20, or a workload instance being performed in the case that the computer 100 is one of the servers (compute nodes) 34.

The hardware elements depicted in the computer 100 are not intended to be exhaustive, but rather are representative. For instance, the computer 100 may include alternate memory storage devices such as magnetic cassettes, digital versatile disks (DVDs), Bernoulli cartridges, and the like. These and other variations are intended to be within the scope of the present invention.

Figure 6:
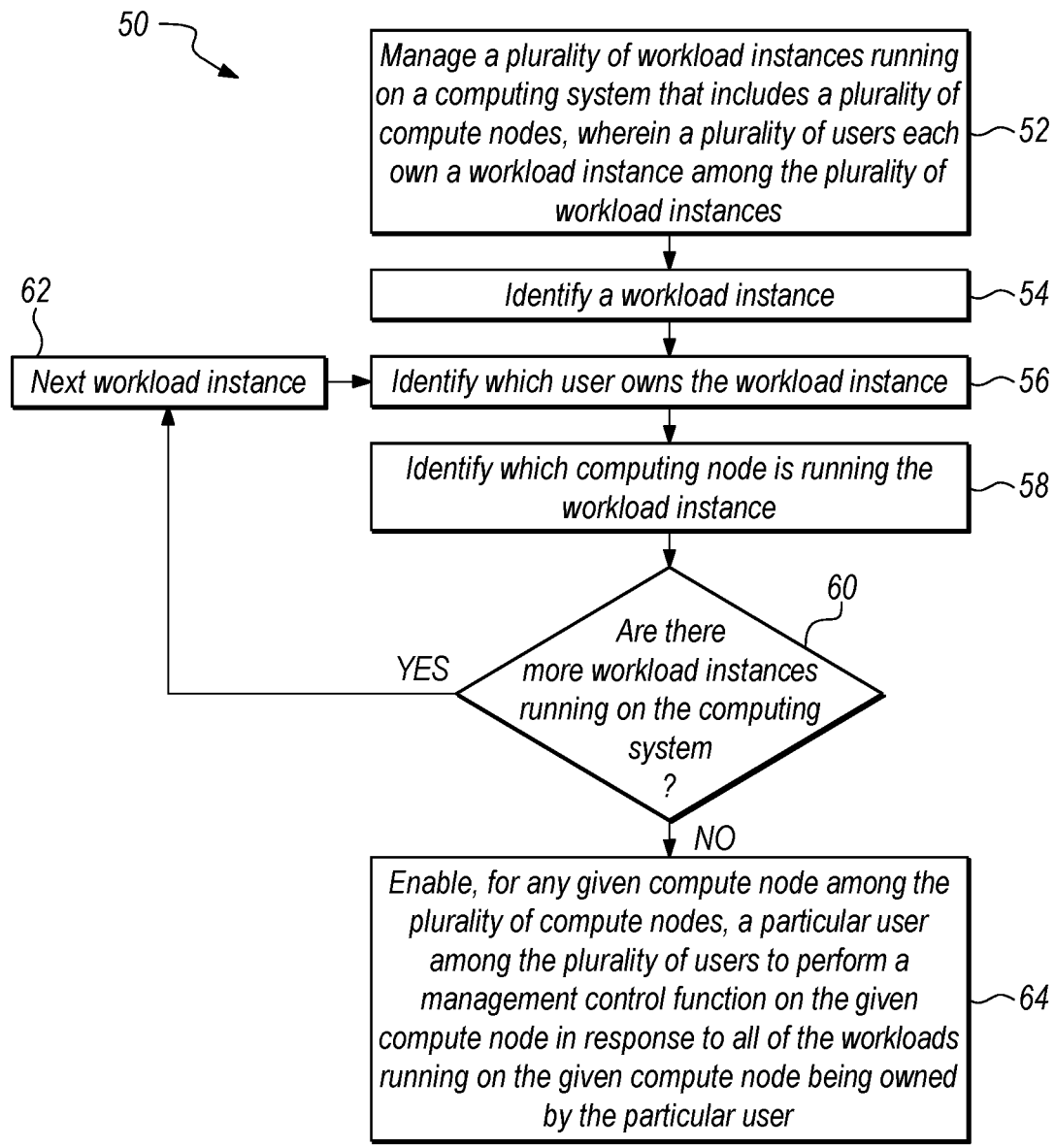
FIG. 6 is a flowchart of operations that may be performed by the system management tools.

FIG. 6 is a flowchart of operations 50 that may be performed by a processor executing program instructions such as the system management tools. Operation 52 manages a plurality of workload instances running on a computing system that includes a plurality of compute nodes, wherein a plurality of users each own a workload instance among the plurality of workload instances. Operation 54 identifies a workload instance. Operation 56 identifies which user among the plurality of users owns the workload instance and operation 58 identifies which compute node among the plurality of compute nodes is running the workload instance. Operation 60 then determines whether there more workload instances running on the computing system. If there are more workload instances, then operation 62 identifies the next workload instance before operations 56, 58 and 60 are repeated for that workload instance. This loop may be repeated until all of the workload instances have been handled. For example, the operations 56, 58, 60, 62 may populate a system management database and the operations 50 may be run periodically or continuously so that the system management database accurately reflect the workload instances, the owner of each workload instance, and the hardware that is running or otherwise being utilized by each workload instance. With this information available, operation 64 may enable, for any given compute node among the plurality of compute nodes, a particular user among the plurality of users to perform a management control function on the given compute node in response to all of the workloads running on the given compute node being owned by the particular user.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer readable medium having program instructions embodied therein, the program instructions being configured to be executable by a processor to cause the processor to perform operations comprising:
    managing a plurality of workload instances running on a computing system that includes a plurality of compute nodes, wherein a plurality of users each own a workload instance among the plurality of workload instances, wherein a plurality of management functions can be performed on each of said plurality of compute nodes, each of said plurality of management functions has an associated level of workload instance ownership, wherein at least two of said associated level of workload instance ownerships are different from each other;
    identifying for each workload instance, which user among the plurality of users owns the workload instance and which compute node among the plurality of compute nodes is running the workload instance; and
    enabling, for a given compute node among the plurality of compute nodes, a particular user among the plurality of users to perform one of the management functions on the given compute node in response to all of the workloads running on the given compute node being owned by the particular user and the workload instance ownership level associated with the one of the management functions requiring the particular user to own all the workload instances running on the given compute node.

2. The computer program product of claim 1, wherein enabling the particular user to perform the one of the management functions on the given compute node includes enabling the particular user to access information about the operation of the compute node wherein the information is not accessible to other users among the plurality of users.

3. The computer program product of claim 1, wherein enabling the particular user to perform the one of the management functions on the given compute node includes enabling the particular user to perform a management control function on the given compute node.

4. The computer program product of claim 1, wherein the particular user is enabled to control power to the compute node.

5. The computer program product of claim 1, further comprising:
    enabling for each workload instance, the user that owns the workload instance to manage the workload instance.

6. The computer program product of claim 5, wherein enabling the user that owns the workload instance to manage the workload instance includes enabling the user that owns the workload instance to access information about the operation of the workload instance.

7. The computer program product of claim 5, wherein enabling the user that owns the workload instance to manage the workload instance includes enabling the user that owns the workload instance to control operation of the workload instance.

8. The computer program product of claim 1, further comprising:
    receiving the plurality of workload instances from the plurality of users; and
    identifying, for each of the workload instances, the user from which the workload instance is received as the owner of the workload.

9. The computer program product of claim 1, further comprising:
    causing a further workload instance to be run on the given compute node; and
    preventing the particular user from performing the one of the management functions on the given compute node in response to the further workload instance running on the given compute node not being owned by the particular user.

10. The computer program product of claim 9, wherein causing the further workload instance to be run on the given compute node includes instructing a compute node among the plurality of compute nodes to migrate the further workload instance to the given compute node from another of the plurality of compute nodes.

11. The computer program product of claim 1, further comprising:
dynamically changing which of the plurality of compute nodes is running a given workload instance among the plurality of workload instances; and
dynamically determining, for a particular compute node among the plurality of compute nodes, whether a given user among the plurality of users owns all of the workloads running on the particular compute node.

12. The computer program product of claim 1, further comprising:
enabling a given user among the plurality of users to manage a multi-node chassis in response to all of the workloads running on compute nodes within the multi-node chassis being owned by the given user.

13. The computer program product of claim 1, further comprising:
enabling, for a particular compute node among the plurality, of compute nodes, a system administrator to manage the compute node regardless of whether all of the workload instances running on the particular compute node are owned by a single user.

14. The computer program product of claim 1, further comprising:
enabling, for a particular compute node among the plurality of compute nodes, a system administrator to manage the particular compute node in response to the workload instances running on the particular compute node not being owned by a single user; and
enabling, for each workload instance, the user that owns the workload instance to manage the workload instance.

15. The computer program product of claim 1, further comprising:
enabling, for a particular compute node among the plurality of compute nodes, a given user among the plurality of users to manage the particular compute node in response to the given user owning one or more of the workloads running on the particular compute node; and
providing the given user that is enabled to manage the particular compute node with notification of management actions that may impact workloads running on the particular compute node that are owned by another user.

16. The computer program product of claim 1, further comprising:
enabling, for a given resource of the computing system, a given user among the plurality of users to perform a management function of the plurality of management functions on the given resource in response to all of the workload instances utilizing the given resource being owned by the given user.

17. The computer program product of claim 16, wherein the given resource is a network switch, data storage device or a network adapter.

18. The computer program product of claim 1, further comprising:
enabling a given user among the plurality of users to delegate a privilege to perform a given management function of the plurality of management functions on a particular compute node for which the given user has been enabled to perform the given management function on the particular compute node.

19. An apparatus, comprising:
at least one non-transitory storage device storing program instructions; and
at least one processor configured to process the program instructions,
wherein the program instructions are configured to, when processed by the at least one processor, cause the apparatus to perform operations comprising:
managing a plurality of workload instances running on a computing system that includes a plurality of compute nodes, wherein a plurality of users each own a workload instance among the plurality of workload instances, wherein a plurality of management functions can be performed on each of said plurality of compute nodes, each of said plurality of management functions has an associated level of workload instance ownership, wherein at least two of said associated level of workload instance ownerships are different from each other;
identifying, for each workload instance, which user among the plurality of users owns the workload instance and which compute node among the plurality of compute nodes is running the workload instance; and
enabling, for a given compute node among the plurality of compute nodes, a particular user among the plurality of users to perform one of the management functions on the given compute node in response to all of the workloads running on the given compute node being owned by the particular user and the workload instance ownership level associated with the one of the management functions requiring the particular user to own all the workload instances running on the given compute node.

20. The apparatus of claim 19, wherein enabling the particular user to perform the one of the management functions on the given compute node includes enabling the particular user to access information about the operation of the compute node, wherein the information is not accessible to other users among the plurality of users.

* * * * *